(12) United States Patent
Park et al.

(10) Patent No.: US 11,798,255 B2
(45) Date of Patent: Oct. 24, 2023

(54) SIGN LANGUAGE VIDEO SEGMENTATION METHOD BY GLOSS FOR SIGN LANGUAGE SENTENCE RECOGNITION, AND TRAINING METHOD THEREFOR

(71) Applicant: Korea Electronics Technology Institute, Seongnam-si (KR)

(72) Inventors: Han Mu Park, Seongnam-si (KR); Jin Yea Jang, Suwon-si (KR); Yoon Young Jeong, Seoul (KR); Sa Im Shin, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/563,205

(22) Filed: Dec. 28, 2021

(65) Prior Publication Data

US 2022/0415009 A1 Dec. 29, 2022

(30) Foreign Application Priority Data

Jun. 29, 2021 (KR) ........................ 10-2021-0084665

(51) Int. Cl.
*G06N 20/00* (2019.01)
*G06V 10/42* (2022.01)
(Continued)

(52) U.S. Cl.
CPC ........ *G06V 10/421* (2022.01); *G06V 10/7747* (2022.01); *G06V 10/84* (2022.01); *G09B 21/009* (2013.01)

(58) Field of Classification Search
None
See application file for complete search history.

(56) References Cited

U.S. PATENT DOCUMENTS 5,890,120 A * 3/1999 Haskell ............... G09B 21/009
704/235
6,491,523 B1 * 12/2002 Altman ............... G09B 21/009
434/156

(Continued)

FOREIGN PATENT DOCUMENTS

KR  10-2003-0030232 A  4/2003
KR     10-2115551 B1  5/2020

OTHER PUBLICATIONS

Guo et al., "Hierarchical LSTM for Sign Language Translation," The Thirty-Second AAAI Conference on Artificial Intelligence (AAAI-18) (Year: 2018).*

(Continued)

*Primary Examiner* — Soo Shin
(74) *Attorney, Agent, or Firm* — NSIP Law

(57) ABSTRACT

There are provided a method for segmenting a sign language video by gloss to recognize a sign language sentence, and a method for training. According to an embodiment, a sign language video segmentation method receives an input of a sign language sentence video, and segments the inputted sign language sentence video by gloss. Accordingly, there is suggested a method for segmenting a sign language sentence video by gloss, analyzing various gloss sequences from the linguistic perspective, understanding meanings robustly in spite of various changes in sentences, and translating sign language into appropriate Korean sentences.

13 Claims, 5 Drawing Sheets

(51) Int. Cl.
   *G06V 10/774*   (2022.01)
   *G06V 10/84*    (2022.01)
   *G06V 40/20*    (2022.01)
   *G09B 21/00*    (2006.01)

(56) References Cited

U.S. PATENT DOCUMENTS

2019/0251702 A1* 8/2019 Chandler ................ G10L 15/24
2019/0354592 A1* 11/2019 Musham ................. G10L 13/00
2023/0005484 A1* 1/2023 Engelke ................. G10L 15/01

OTHER PUBLICATIONS

Wei et al., "Semantic Boundary Detection With Reinforcement Learning for Continuous Sign Language Recognition," IEEE Transactions on Circuits and Systems for Video Technology, vol. 31, No. 3, Mar. 2021 (Year: 2021).*
Korean Office Action dated Dec. 19, 2022, in counterpart Korean Patent Application No. 10-2021-0084665 (2 pages in English, 4 pages in Korean).

* cited by examiner

SIGN LANGUAGE VIDEO SEGMENTATION METHOD BY GLOSS FOR SIGN LANGUAGE SENTENCE RECOGNITION, AND TRAINING METHOD THEREFOR

CROSS-REFERENCE TO RELATED APPLICATION(S) AND CLAIM OF PRIORITY

This application is based on and claims priority under 35 U.S.C. § 119 to Korean Patent Application No. 10-2021-84665, filed on Jun. 29, 2021, in the Korean Intellectual Property Office, the disclosure of which is herein incorporated by reference in its entirety.

BACKGROUND

Field

The present disclosure relates generally to artificial intelligence (AI) technology, and more particularly, to a method for segmenting a sign language video to recognize a sign language sentence, and a method for training an AI model used for segmentation.

Description of Related Art

The repaid development of artificial intelligence (AI) technology enables automatic recognition of sign language from a sign language video. Current deep learning-based sign language recognition techniques follow the End-to-End training method which directly generates sign language from a video.

However, this method requires training a neutral network by using many training videos and sign language data, and, even if this requirement is satisfied, the method does not show satisfactory recognition performance.

This is because a sign language sentence is expressed by a continuous sequence of glosses, but existing methods recognize the sentence in the lump. Accordingly, there is a need for an attempt to recognize sign language with a new approach.

SUMMARY

To address the above-discussed deficiencies of the prior art, it is a primary object of the present disclosure to provide a method for segmenting a sign language sentence video by gloss, analyzing various gloss sequences from the linguistic perspective, understanding meanings robustly in spite of various changes in sentences, and translating sign language into appropriate Korean sentences.

According to an embodiment of the present disclosure to achieve the above-described object, a sign language video segmentation method includes the steps of: receiving an input of a sign language sentence video; and segmenting the inputted sign language sentence video by gloss.

The step of segmenting may include the steps of: segmenting the inputted sign language sentence video into a plurality of video segments; with respect to the segmented video segments, estimating segmentation probability distributions indicating whether the video segments should be segmented; and confirming whether the video segments are segmented and confirming a segmentation position, based on the estimated segmentation probability distributions of the video segments, and generating a video sequence which is segmented by gloss.

The video segment may overlap other video segments in part.

The step of estimating may include estimating the segmentation probability distribution expressing whether each video segment should be segmented, by a probability distribution according to time. The step of estimating may include estimating the segmentation probability distribution by using an AI model.

The AI model may be trained by using training video segments which are generated from a training sign language sentence video dataset in which a start point and an end point of a sign language sentence video and start points and end points of respective glosses are specified by labels.

The AI model may be trained by using training video segments which are generated from a virtual sign language sentence video, the virtual sign language sentence video being generated by connecting gloss videos constituting a training gloss video dataset established on a gloss basis.

The step of generating includes the steps of: detecting whether each video segment is segmented and a segmentation position, based on the estimated segmentation probability distribution; and generating a video sequence on a gloss basis with reference to the detected segmentation position.

The step of detecting may include the steps of: generating one probability distribution by collecting the estimated respective segmentation probability distributions of the video segments; and detecting whether the video segments are segmented and the segmentation position from the collected probability distributions.

According to another embodiment of the present disclosure, a sign language video segmentation system includes: an input unit configured to receive an input of a sign language sentence video; and a segmentation unit configured to segment the inputted sign language sentence video by gloss.

According to still another embodiment, a sign language video segmentation method incudes the steps of: training an AI model which receives an input of a sign language sentence video and outputs a video sequence which is segmented by gloss; and segmenting an inputted sign language sentence video by gloss by using the trained AI model.

According to yet another embodiment, a sign language video segmentation system includes: a training unit configured to train an AI model which receives an input of a sign language sentence video and outputs a video sequence which is segmented by gloss; and a segmentation unit configured to segment an inputted sign language sentence video by gloss by using the trained AI model.

According to various embodiments of the present disclosure as described above, there may be suggested a method for segmenting a sign language sentence video by gloss, analyzing various gloss sequences from the linguistic perspective, understanding meanings robustly in spite of various changes in sentences, and translating sign language into appropriate Korean sentences.

According to various embodiments of the present disclosure, a plurality of training data may be generated by themselves from a real sign language sentence video dataset, and also, plenty of training data of an AI model for segmenting a sign language sentence video by gloss may be acquired by generating virtual training data by virtually connecting gloss videos.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in more detail with reference to the accompanying drawings.

Since sign language is a separate language that has a different grammatical system from Korean language, there may be various combinations of gloss sequences corresponding to a meaning of the same Korean sentence. In order to translate gloss sequences of various combinations, a sign language sentence video is required to be analyzed on a gloss basis.

To achieve this, a technique for segmenting a sign language video by gloss is needed. Accordingly, embodiments of the present disclosure suggest a method for segmenting a sign language video by gloss, by automatically extracting gloss sections which are semantic units in the video, in order to recognize a sign language sentence. This may be approached by a method of detecting a boundary between glosses by utilizing an AI model.

In addition, embodiments of the present disclosure may provide self-generation of a plurality of training data from a real sign language sentence video dataset, and generation of virtual training data by virtually connecting gloss videos, as a solution to acquire plenty of training data for an AI model for segmenting a sign language sentence video.

Figure 1:
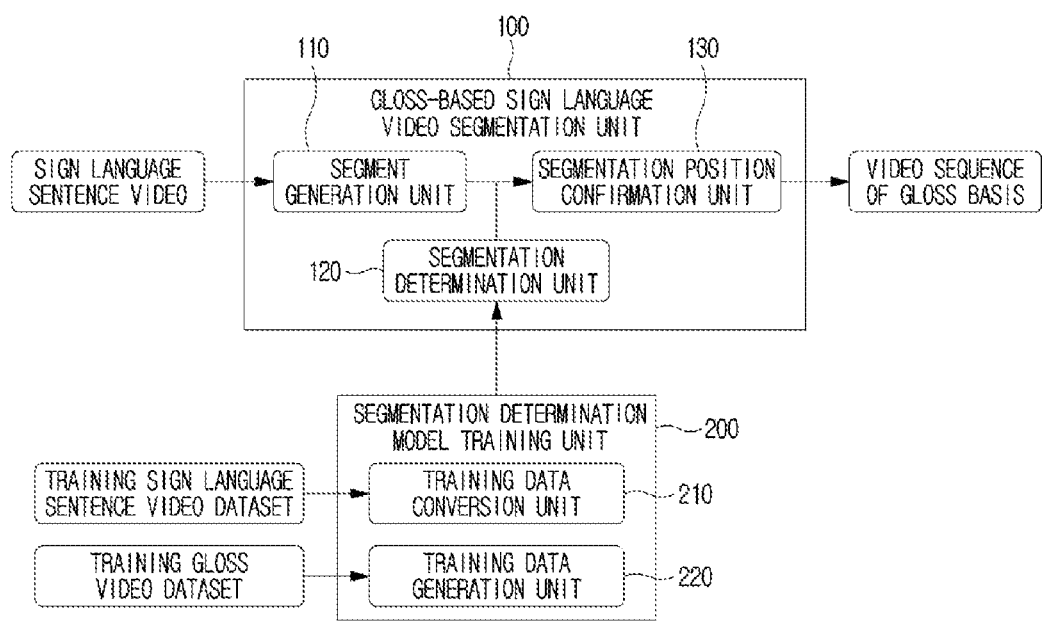
FIG. 1 is a view illustrating a sign language video segmentation system according to an embodiment of the present disclosure.

FIG. 1 is a block diagram of a sign language video segmentation system according to an embodiment of the present disclosure. The sign language video segmentation system according to an embodiment is established by including a gloss-based sign language video segmentation unit 110 and a segmentation determination model training unit 200 as shown in the drawing.

The gloss-based sign language video segmentation unit 100 receives an input of a sign language sentence video, and generates a video sequence that is segmented by gloss, from the inputted sign language sentence video.

The gloss-based sign language video segmentation unit 100 which performs the above-described function may include a segment generation unit 110, a segmentation determination unit 120, and a segmentation position confirmation unit 130.

The segment generation unit 110 receives the input of the sign language sentence video, and generates a plurality of video segments having a short length by segmenting the sign language sentence video into video segments having the same length.

Figure 2:
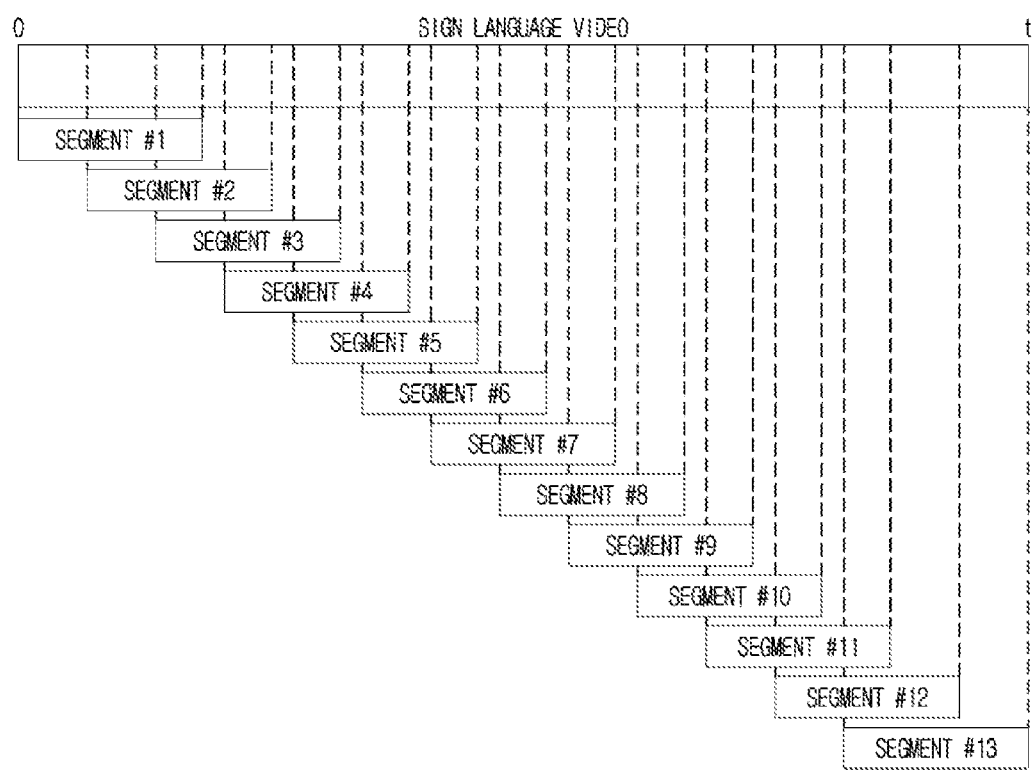
FIG. 2 is a view illustrating a video segment generation method.

The length of the video segments generated by the segment generation unit 110 may be arbitrarily determined, and each of the video segments may overlap other neighboring video segments in part as shown in FIG. 2.

A range of overlapping in part is not limited to directly adjacent video segments. That is, as shown in FIG. 2, video segment #5 may overlap video segment #3 and video segment #4 which precede video segment #5 in part, and may overlap video segment #6 and video segment #7 which follow video segment #5 in part. The segmentation method shown in FIG. 2 is merely an example, and the video may be segmented such that video segments in a wider range overlap each other in part.

The segmentation determination unit 120 is an AI model that receives the video segments generated at the segment generation unit 110, and determines whether each of the video segments should be segmented, and outputs a segmentation probability distribution expressing a result of determination by a probability distribution according to time.

Figure 3:
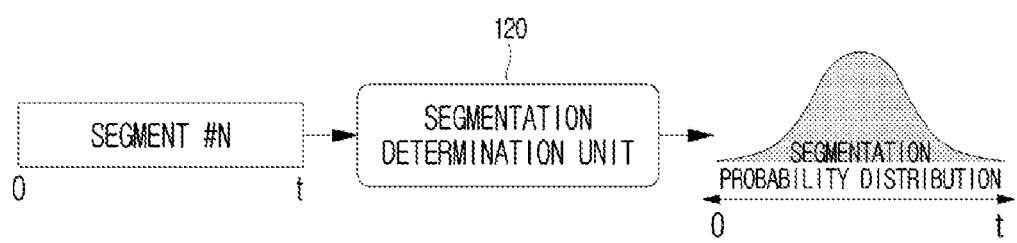
FIG. 3 is a view illustrating a process of determining whether to segment.

FIG. 3 schematically illustrates a concept of estimating a segmentation probability distribution regarding each video segment by the segmentation determination unit 120. The probability distribution may be a certain probability distribution defined by a user, in addition to a normal distribution.

The AI model of the segmentation determination unit 120 may be already trained by using training data which is provided through the segmentation determination model training unit 200, which will be described below.

The segmentation position confirmation unit 130 may confirm whether the video segments are segmented, based on the segmentation probability distributions regarding the video segments estimated by the segmentation determination unit 120, and may confirm a segmentation position regarding a video segment that is confirmed to be segmented. Accordingly, a video sequence which is segmented by gloss is generated at the segmentation position confirmation unit 130.

Figure 4:
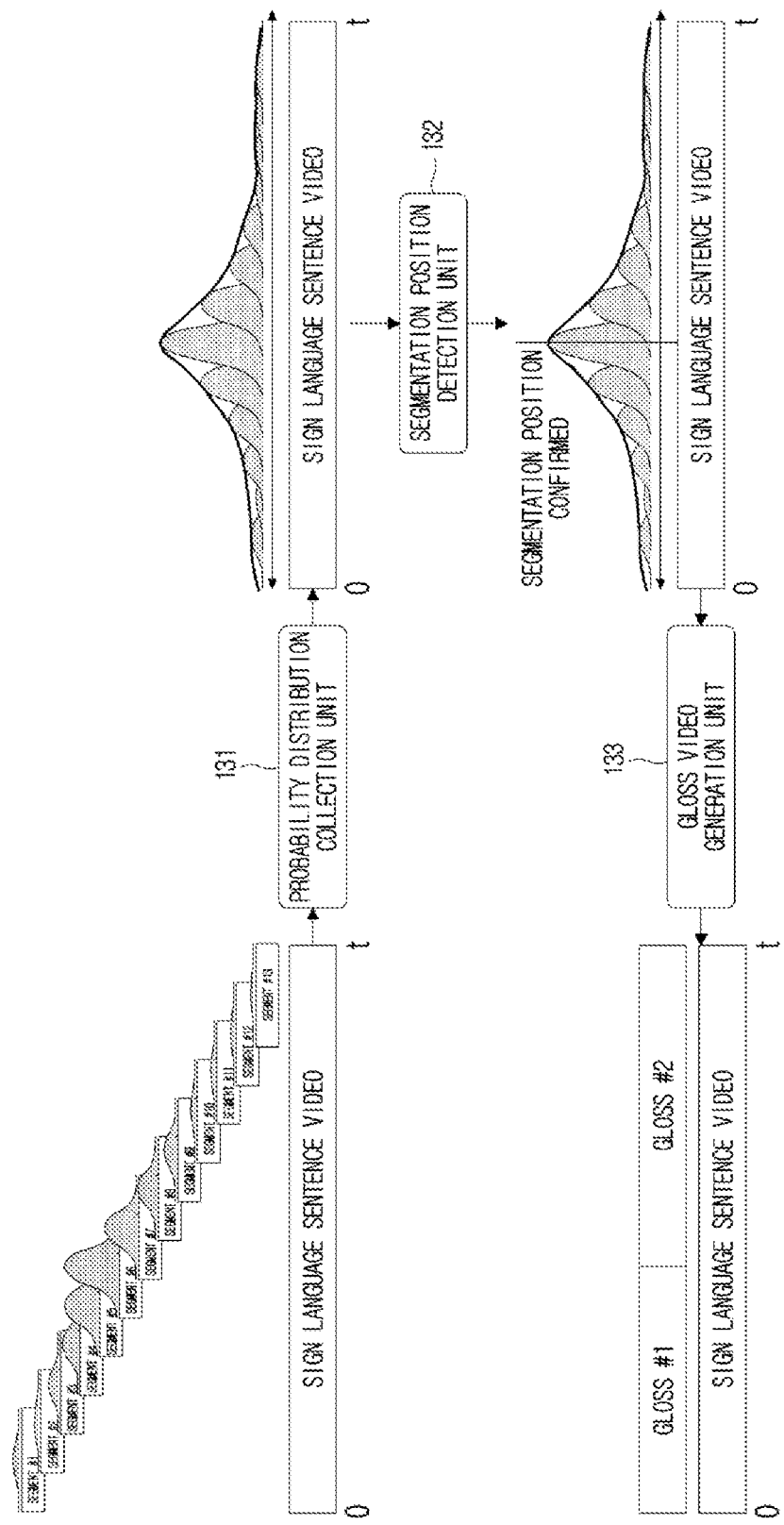
FIG. 4 is a view illustrating a process of confirming a segmentation position and segmenting a video.

The segmentation position confirmation unit 130 performing the above-described function may include a probability distribution collection unit 131, a segmentation position detection unit 132, and a gloss video generation unit 133, as shown in FIG. 4.

The probability distribution collection unit 131 generates one probability distribution by collecting all of the segmentation probability distributions regarding the respective video segments, which are estimated by the segmentation determination unit 120.

The segmentation position detection unit 132 may detect segmentation positions from the one probability distribution collected by the probability distribution collection unit 131. There may be two or more positions for segmenting according to an inputted sign language video. Of course, there may be one segmentation position or there may be no segmentation position.

The gloss video generation unit 133 may segment the sign language sentence video with reference to the segmentation positions detected by the segmentation position detection unit 132, and may generate/output the video sequence which is segmented by gloss.

Referring back to 1, the present disclosure will be described.

The segmentation determination model training unit 200 is a means for training the AI model which estimates the segmentation probability distribution at the segmentation determination unit 120 of the gloss-based sign language video segmentation unit 100, and may include a training data conversion unit 210 and a training data generation unit 200.

The training data conversion unit 210 generates training video segments of a defined length, from a 'training sign language sentence video dataset' in which start/end points of a sign language sentence video and each gloss are specified by labels.

The training data conversion unit 210 generates the training video segments in such a manner that, when a gloss change point is on a center of a video segment, it gives the video segment a highest probability.

The training data generation unit 220 generates a virtual sign language sentence video by connecting gloss videos of a 'training gloss video dataset' which is established on the gloss basis. In this case, the gloss videos may be directly connected without modification, or may be naturally connected through modification such as motion blending, etc.

Furthermore, other virtual sign language sentence videos may further be generated by randomly changing the order of gloss videos constituting the generated virtual sign language sentence video.

The virtual sign language sentence video generated at the training data generation unit 220 may be processed at the training data conversion unit 210 in the same way as a real sign language sentence video, and may be utilized for training.

Up to now, the gloss-based sign language video segmentation and training methods for recognition of the sign language sentence have been described in detail.

In the above-described embodiments, a method for segmenting a sign language sentence video by gloss by utilizing an AI model is suggested.

Accordingly, there is suggested a method for segmenting a sign language sentence video by gloss, analyzing various gloss sequences from the linguistic perspective, understanding meanings robustly in spite of various changes in sentences, and translating sign language into appropriate Korean sentences.

In addition to a method for self-generation of a plurality of training data for an AI model from one sign language video data, there is suggested a method of adding training data by virtually connecting gloss videos.

Accordingly, plenty of training data for the AI model for segmenting the sign language sentence video by gloss may be acquired.

Figure 5:
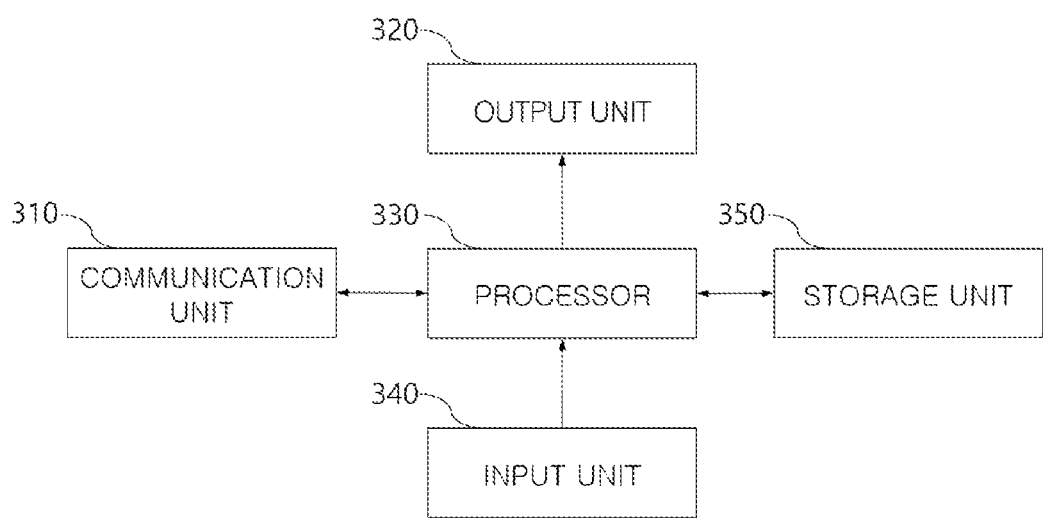
FIG. 5 is a view illustrating a hardware structure which is able to implement the sign language video segmentation system.

FIG. 5 is a view illustrating a hardware structure which is able to implement the sign language video segmentation system according to an embodiment of the present disclosure.

The sign language video segmentation system according to an embodiment may be implemented by a computing system which is established by including a communication unit 310, an output unit 320, a processor 330, an input unit 330, and a storage unit 350.

The communication unit 310 is a communication means for communicating with an external device and for accessing an external network. The output unit 320 is a display that displays a result of executing by the processor 330, and the input unit 340 is a user input means for transmitting a user command to the processor 330.

The processor 330 is configured to perform functions of the means constituting the sign language video segmentation system shown in FIG. 1, and includes a plurality of graphic processing units (GPUs) and a central processing unit (CPU).

The storage unit 350 provides a storage space necessary for operations and functions of the processor 330.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A sign language video segmentation method comprising:
receiving an input of a sign language sentence video;
segmenting the inputted sign language sentence video by gloss into a plurality of video segments; and
estimating segmentation probability distributions, each indicating whether inputted sign language sentence video should be segmented, using a neural network-based model;
confirming whether the plurality of video segments are segmented and confirming a respective segmentation position of a respective video segment, of the plurality of video segments, based on the estimated segmentation probability distributions associated with the plurality of video segments; and
generating a video sequence which is segmented by the gloss,
wherein the neural network-based model is trained by using training video segments which are generated from a training sign language sentence video dataset in which a start point and an end point of the training sign language sentence video and start points and end points of respective glosses are specified by labels, and wherein the generating comprises:
  detecting whether each video segment is segmented and the respective segmentation position has a highest probability from the estimated segmentation probability distributions; and
  generating the video sequence with reference to the detected segmentation position having the highest probability.

2. The method of claim 1, wherein a video segment, of the plurality of video segments, overlaps at least some of the plurality of video segments in part.

3. The method of claim 1, wherein the estimating comprises estimating a segmentation probability distribution, of the segmentation probability distributions, expressing whether each video segment should be segmented, by a probability distribution according to time.

4. The method of claim 3, wherein the estimating comprises estimating the segmentation probability distribution by using the neural network-based model.

5. The method of claim 4, wherein the neural network-based model is trained by using the training video segments which are generated from a virtual sign language sentence video, the virtual sign language sentence video being generated by connecting gloss videos constituting a training gloss video dataset established on a gloss basis.

6. The method of claim 1, wherein the detecting comprises:
  generating one probability distribution by collecting the estimated respective segmentation probability distributions of the video segments; and
  detecting whether the video segments are segmented and the segmentation position from the collected probability distributions.

7. A sign language video segmentation system comprising:
  one or more processors configured to:
    receive an input of a sign language sentence video;
    segment the inputted sign language sentence video by gloss into a plurality of video segments; and
    estimate segmentation probability distributions, each indicating whether inputted sign language sentence video should be segmented, using a neural network-based model;
    confirm whether the plurality of video segments are segmented and confirm a respective segmentation position of a respective video segment, of the plurality of video segments, based on the estimated segmentation probability distributions associated with the plurality of video segments; and
    generate a video sequence which is segmented by the gloss,
  wherein the neural network-based model is trained by using training video segments which are generated from a training sign language sentence video dataset in which a start point and an end point of the training sign language sentence video and start points and end points of respective glosses are specified by labels, and
  wherein, for the generating, the one or more processors are configured to:
    detect whether each video segment is segmented and the respective segmentation position has a highest probability from the estimated segmentation probability distributions; and
    generate the video sequence with reference to the detected segmentation position having the highest probability.

8. The system of claim 7, wherein a video segment, of the plurality of video segments, overlaps at least some of the plurality of video segments in part.

9. The system of claim 7, wherein, for the estimating, the one or more processors are configured to estimate a segmentation probability distribution, of the segmentation probability distributions, expressing whether each video segment should be segmented, by a probability distribution according to time.

10. The system of claim 9, wherein, for the estimating, the one or more processors are configured to estimate the segmentation probability distribution by using the neural network-based model.

11. The system of claim 10, wherein the neural network-based model is trained by using the training video segments which are generated from a virtual sign language sentence video, the virtual sign language sentence video being generated by connecting gloss video constituting a training gloss video dataset established on a glass basis.

12. The system of claim 7, wherein, for the detecting, the one or more processors are configured to:
  generate one probability distribution by collecting the estimated respective segmentation probability distributions of the video segments; and
  detect whether the video segments are segmented and the segmentation position from the collected probability distributions.

13. A sign language video segmentation method comprising:
  training a neural network-based model which receives an input of a sign langue sentence video and outputs a video sequence which is segmented by gloss;
  segmenting the inputted sign language sentence video by the gloss into a plurality of video segments by using the neural network-based model;
  estimating segmentation probability distributions, each indicating whether the inputted sign language sentence video should be segmented, using the neural network-based model;
  confirming whether the plurality of video segments are segmented and confirming a respective segmentation position of a respective video segment, of the plurality of video segments, based on the estimated segmentation probability distributions associated with the plurality of video segments; and
  generating a video sequence which is segmented by the gloss,
  wherein the neural network-based model is trained by using training video segments which are generated from a training sign language sentence video dataset in which a start point and an end point of the training sign language sentence video and start points and end points of respective glosses are specified by labels, and
  wherein the generating comprises:
  detecting whether each video segment is segmented and the respective segmentation position has a highest probability from the estimated segmentation probability distributions; and
  generating the video sequence with reference to the detected segmentation position having the highest probability.

* * * * *